US008792106B2

(12) United States Patent
Iwayama

(10) Patent No.: US 8,792,106 B2
(45) Date of Patent: Jul. 29, 2014

(54) IMAGE READING APPARATUS INCLUDING DOCUMENT SEPARATING MECHANISM, IMAGE READING METHOD, AND COMPUTER PROGRAM PRODUCT

(75) Inventor: Akira Iwayama, Ishikawa (JP)

(73) Assignee: PFU Limited, Ishikawa (JP)

( * ) Notice: Subject to any disclaimer, the term of this patent is extended or adjusted under 35 U.S.C. 154(b) by 639 days.

(21) Appl. No.: 12/723,592

(22) Filed: Mar. 12, 2010

(65) Prior Publication Data
US 2010/0231943 A1 Sep. 16, 2010

(30) Foreign Application Priority Data

Mar. 13, 2009 (JP) ................................ 2009-062060

(51) Int. Cl.
*G06K 15/00* (2006.01)
(52) U.S. Cl.
USPC .......... 358/1.12; 358/1.17; 358/498; 399/401
(58) Field of Classification Search
None
See application file for complete search history.

(56) References Cited

U.S. PATENT DOCUMENTS

| 4,171,129 | A | | 10/1979 | Daley et al. | |
|---|---|---|---|---|---|
| 5,462,265 | A | * | 10/1995 | Mandel et al. | 270/58.09 |
| 5,751,402 | A | * | 5/1998 | Nakamura et al. | 355/40 |
| 5,767,946 | A | * | 6/1998 | Nakamura et al. | 355/40 |
| 5,796,490 | A | * | 8/1998 | Shidara et al. | 358/296 |
| 7,248,829 | B2 | * | 7/2007 | Kobayashi | 399/410 |
| 2004/0114155 | A1 | * | 6/2004 | Kurahashi et al. | 358/1.1 |
| 2004/0165207 | A1 | * | 8/2004 | Kashiwagi | 358/1.13 |
| 2005/0238205 | A1 | * | 10/2005 | Kimura et al. | 382/112 |
| 2006/0126101 | A1 | * | 6/2006 | Shutt et al. | 358/1.15 |
| 2007/0171438 | A1 | * | 7/2007 | Itoh | 358/1.6 |
| 2007/0229926 | A1 | * | 10/2007 | Morisaki et al. | 358/527 |
| 2008/0151307 | A1 | * | 6/2008 | Minamida et al. | 358/3.24 |

FOREIGN PATENT DOCUMENTS

| JP | 3062960 B2 | 5/2000 |
|---|---|---|
| JP | 2005-311766 | 11/2005 |
| JP | 2008193470 A | 8/2008 |
| JP | 2008219330 A | 9/2008 |

OTHER PUBLICATIONS

Notification of Reasons for Refusal issued in Japanese Application No. 2009-062060, dated Nov. 13, 2012.

* cited by examiner

*Primary Examiner* — Firmin Backer
*Assistant Examiner* — Nicholas Pachol
(74) *Attorney, Agent, or Firm* — Lowe Hauptman & Ham, LLP

(57) ABSTRACT

An image reading apparatus includes a hopper unit, a separating unit, a reading unit, an ejecting unit, a stacking unit, a control unit, and a storage unit. The control unit includes a detecting unit that detects abnormal reading of the document read by the reading unit, an image storing unit that associates the read image and an abnormal reading result with a reading order of the document to store, a separation stacking unit that controls the ejecting unit to separate the document in which the abnormal reading is detected and the document in which the abnormal reading is not detected to eject to the stacking unit, a rereading unit that allows the reading unit to read again the document in which the abnormal reading is detected, thereby obtaining a reread image, and an image replacing unit that replaces the image corresponding to the reading order with the reread image.

14 Claims, 13 Drawing Sheets

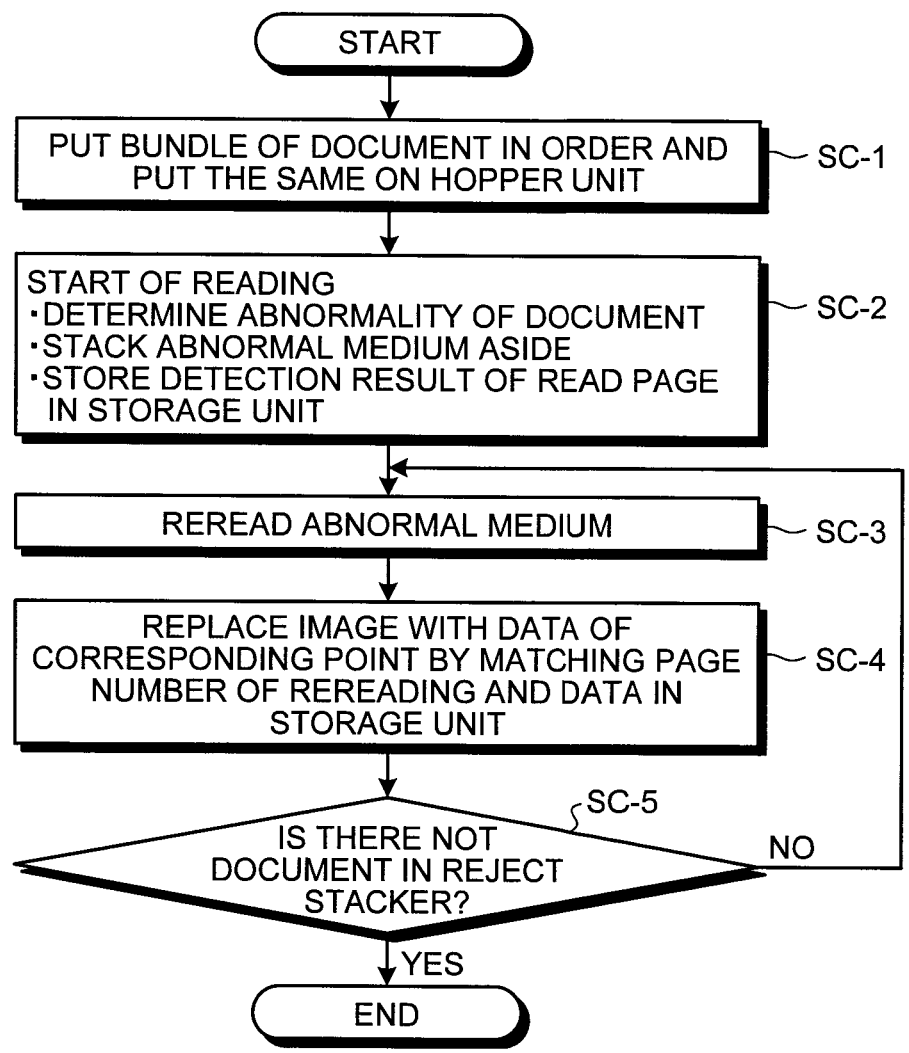

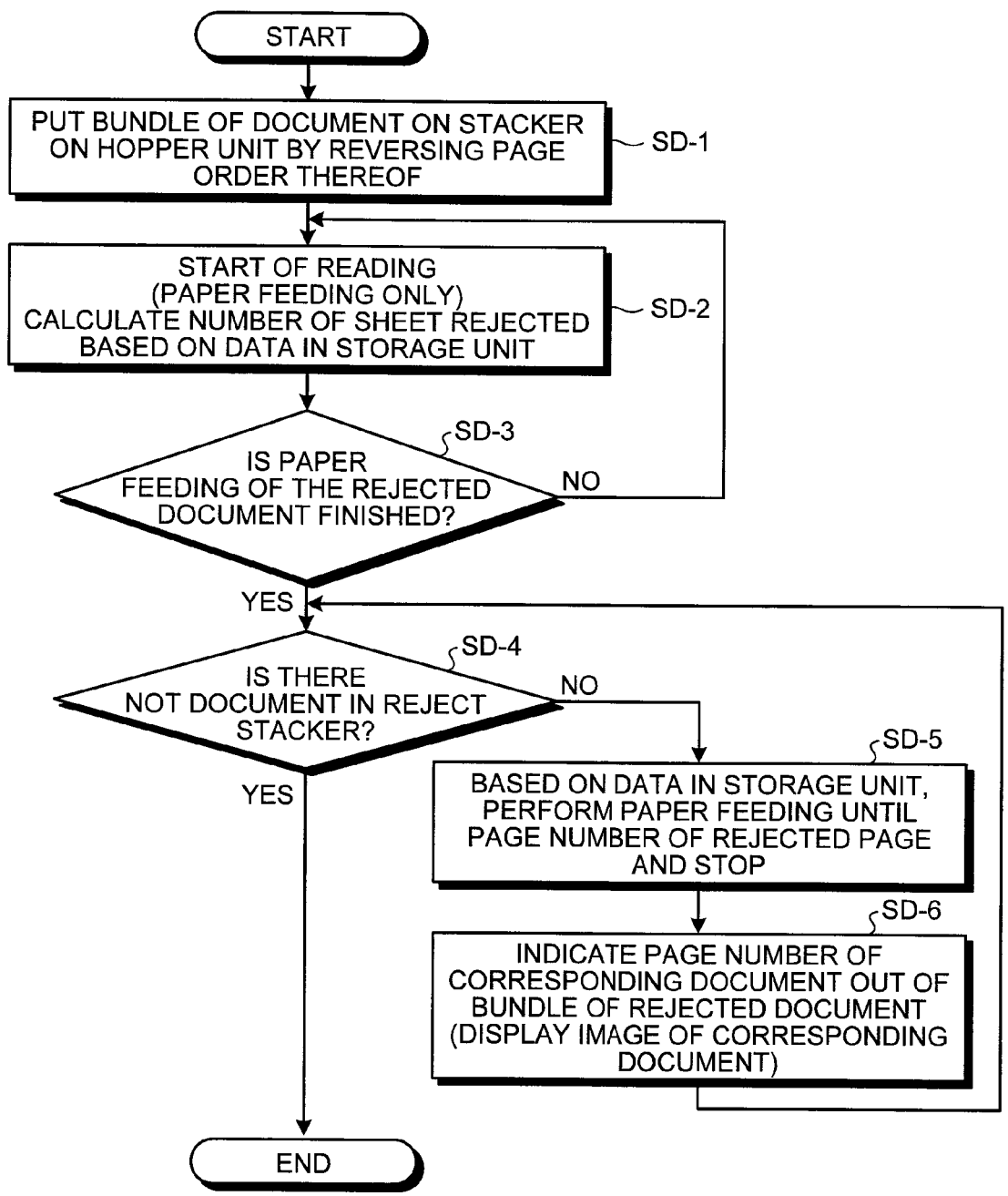

FIG.8A
BUNDLE OF DOCUMENT OF WHICH READING DOES NOT START
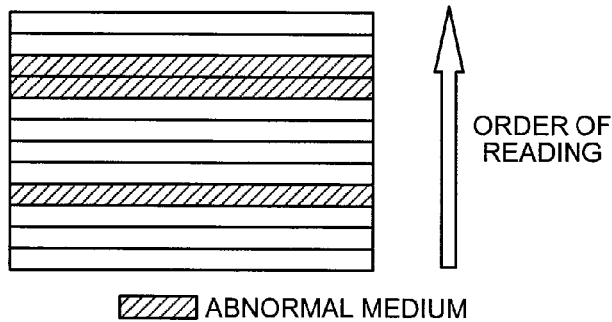
ORDER OF READING
▨ ABNORMAL MEDIUM
FIG.8B
NUMBER DATA READ AT A TIME, AND STORE DETECTION STATE
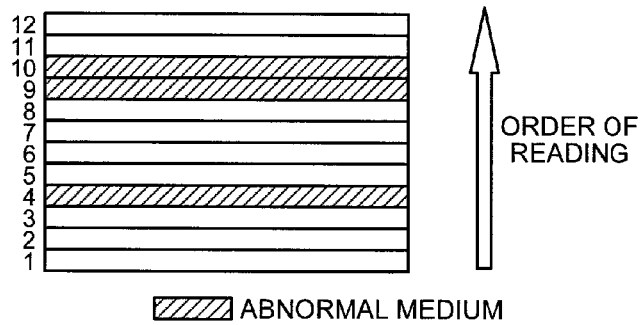
ORDER OF READING
▨ ABNORMAL MEDIUM
FIG.8C
STATE OF STACKING
(STATE OF DOCUMENT WHICH IS SEPARATED INTO TWO STACKER)
ACCEPT STACKER        REJECT STACKER
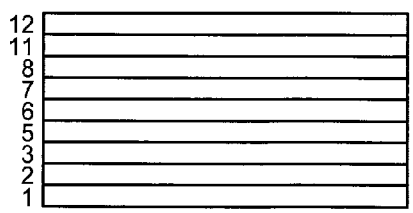    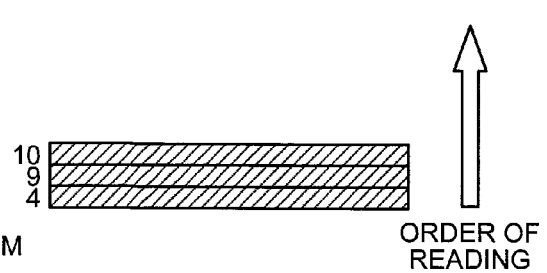
▨ ABNORMAL MEDIUM        ORDER OF READING

PERFORM RESCANNING OF REJECTED DOCUMENT (FIRST TIME)

PERFORM RESCANNING OF REJECTED DOCUMENT (SECOND TIME)

PERFORM RESCANNING OF BUNDLE OF DOCUMENT ON ACCEPT STACKER UPSIDE DOWN, AND EJECT MEDIUM REQUIRED TO BE SORTED TO REJECT STACKER

STOP SCANNING AT POINT OF REJECTED DOCUMENT, DISPLAY CORRESPONDING PAGE NUMBER AND IMAGE IN REJECT STACKER ON DISPLAY UNIT, ADD CORRESPONDING PAGE TO HOPPER UNIT, AND CONTINUOUSLY READ (UNTIL THERE IS NO MORE DOCUMENT ON HOPPER UNIT)

PERFORM SIMILAR PROCESS UNTIL THERE IS NO MORE DOCUMENT ON HOPPER UNIT

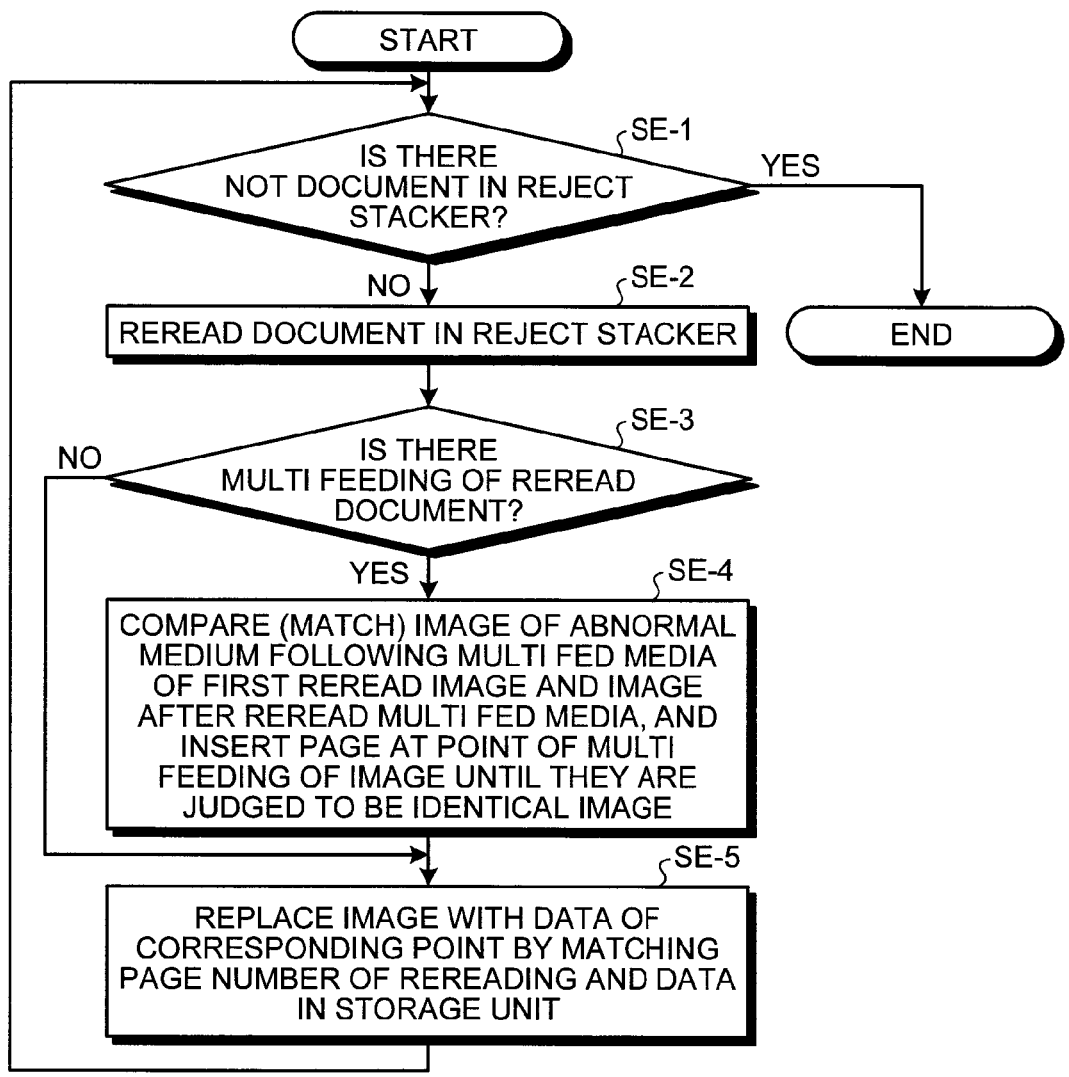

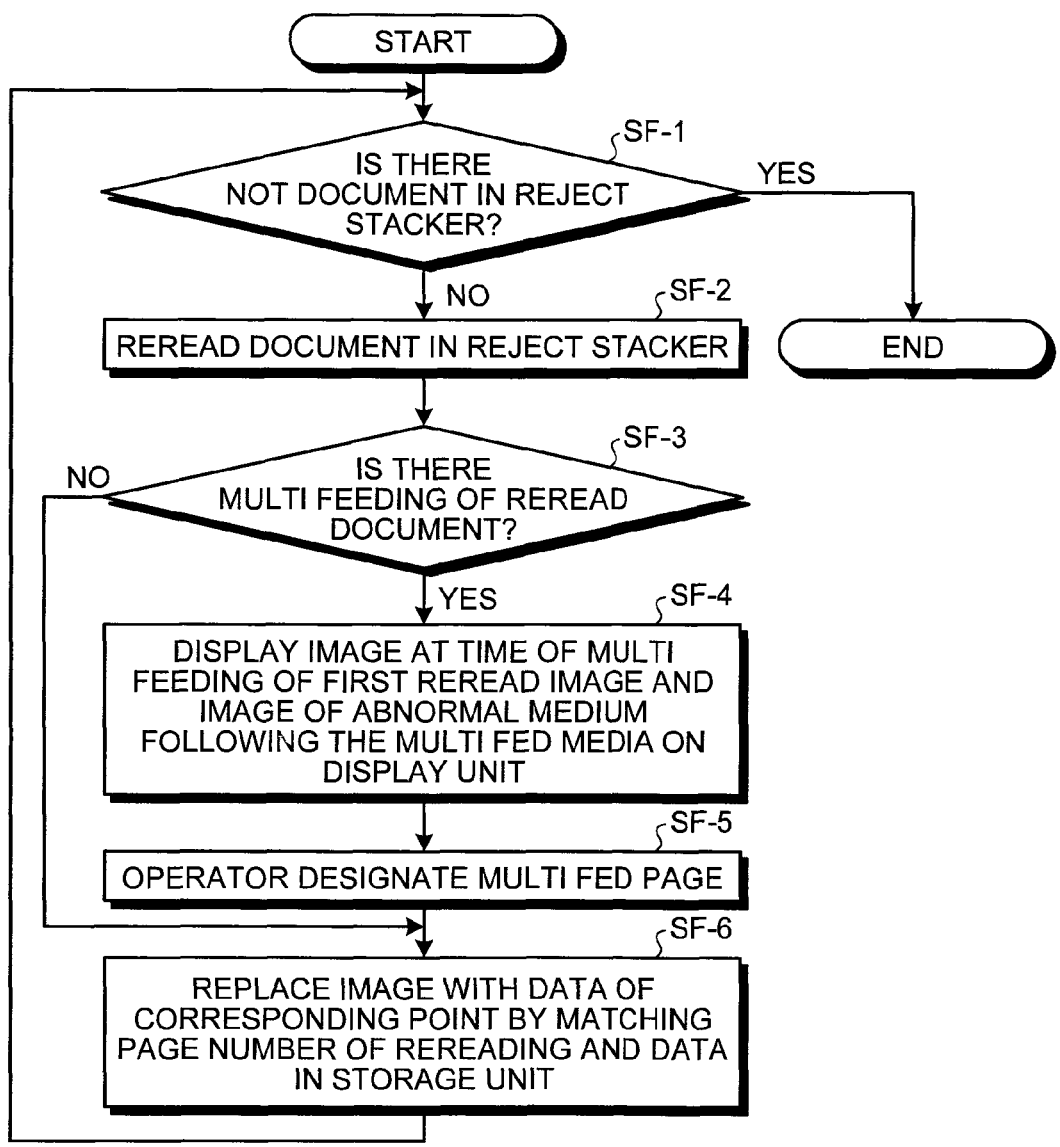

BUNDLE OF DOCUMENT OF WHICH READING IS NOT STARTED

▨▨▨ ABNORMAL MEDIUM
░░░ MULTI FED MEDIUM

NUMBER DATA READ AT A TIME, AND STORE DETECTION STATE
COUNT MULTI FED MEDIA AS ONE MEDIUM IN STORAGE UNIT

▨▨▨ ABNORMAL MEDIUM
░░░ MULTI FED MEDIUM

STATE OF STACKING
(STATE OF DOCUMENT WHICH IS SEPARATED INTO TWO STACKER)

▨▨▨ ABNORMAL MEDIUM
░░░ MULTI FED MEDIUM

PERFORM RESCANNING OF REJECTED DOCUMENT

ACCEPT STACKER                REJECT STACKER

▨▨▨ ABNORMAL MEDIUM
▦▦▦ MULTI FED MEDIUM

MEDIUM FOLLOWING PAGE IN WHICH MULTI FEEDING IS DETECTED
ALLOW TO DESIGNATE INSERTION POINT USING DISPLAY UNIT

ACCEPT STACKER                REJECT STACKER

▨▨▨ ABNORMAL MEDIUM
▦▦▦ MULTI FED MEDIUM

IMAGE READING APPARATUS INCLUDING DOCUMENT SEPARATING MECHANISM, IMAGE READING METHOD, AND COMPUTER PROGRAM PRODUCT

CROSS-REFERENCE TO RELATED APPLICATIONS

This application is based upon and claims the benefit of priority from Japanese Patent Application No. 2009-062060, filed Mar. 13, 2009, the entire contents of which are incorporated herein by reference.

BACKGROUND OF THE INVENTION

1. Field of the Invention

The present invention relates to an image reading apparatus, an image reading method, and a computer program product.

2. Description of the Related Art

In a conventional image reading apparatus, a technique to detect a reading error by analyzing an image of the read document to present the document of which the reading error is detected is disclosed.

For example, in the technique disclosed in the JP-B-3062960, the technique to deliver a form in which the form, which performs abnormal travel such as multi feeding and oblique travel, is sent to a hopper unit, which does not perform separating operation, to separate the form again to allow the same to be recognized, thereby minimizing the number of unrecognizable forms to separate a stack into two types is disclosed. That is to say, the technique disclosed in the JP-B-3062960 discloses the technique capable of ejecting a document of which reading is completed by using an accept stacker and of sorting and ejecting the document required to be reread by using a reject stacker.

Referring to FIG. 1, one example of an image reading processing utilizing conventional art (JP-B-3062960 and the like) will be explained. FIG. 1 is a flowchart showing one example of an image reading processing in conventional art.

As shown in FIG. 1, a user puts a bundle of documents in order and puts the same on a hopper unit (step SA-1). An image reading apparatus starts reading the document and stacks an abnormal medium (document required to be reread) aside (that is to say, in the reject stacker) (step SA-2). The image reading apparatus rereads the document required to be reread to replace a read image (step SA-3). The user designates a location (that is to say, a page in the bundle of documents) of rejection at the time of reading at the step SA-2 based on the image read by rereading and the bundle of documents normally read stacked in the accept stacker (step SA-4). The user returns the reread document to the location designated at the step SA-4 of the bundle of documents stacked in the accept stacker (step SA-5).

In the technique disclosed in the JP-A-2005-311766, for example, the technique to automatically detect a scanning error, return the document in which the scanning error occurs required to be reread to the bundle of ejected documents in order, forward to a corresponding page number (of the document required to be reread) in the bundle of the ejected documents, and present and notify the document required to be reread to the user is disclosed.

Referring to FIG. 2, one example of an image reading processing utilizing conventional art (JP-A-2005-311766 and the like) will be explained. FIG. 2 is a flowchart showing one example of an image reading processing in conventional art.

As shown in FIG. 2, the user puts the bundle of documents in order and puts the same on the hopper unit (step SB-1). The image reading apparatus starts reading the document (step SB-2). The user visually confirms a reading result (that is to say, the document required to be reread) presented by the image reading apparatus, extracts the medium required to be reread (step SB-3), and picks the document required to be reread from the bundle of stacked documents (step SB-4). The image reading apparatus rereads the document required to be reread to replace the read image (step SB-5). The user returns the reread document to the bundle of stacked documents (step SB-6).

However, in the conventional image reading apparatus disclosed in the JP-B-3062960, the form is ejected to different stackers based on only judgment whether this is normally read, and a reading order (page) of the read forms is not managed, and there is a problem that it is not possible to coordinate the read forms by recreating the reading order thereof.

Since the conventional image reading apparatus disclosed in the JP-A-2005-311766 forwards the document, which is not required to be reread, when presenting the document required to be reread to the user, there is a problem that it takes time when the number of documents in the bundle is enormous. The conventional image reading apparatus disclosed in the JP-A-2005-311766 has a problem that it is necessary to manually separate the read documents when separating to obtain the document, which is not required to be reread, and the document required to be reread.

SUMMARY OF THE INVENTION

It is an object of the present invention to at least partially solve the problems in the conventional technology.

An image reading apparatus according to one aspect of the present invention includes a hopper unit on which a document is set, a separating unit that separates the document set on the hopper unit one by one, a reading unit that reads an image of the document separated by the separating unit, an ejecting unit that ejects the document read by the reading unit, a stacking unit that stacks the document ejected by the ejecting unit, a control unit, and a storage unit, wherein the control unit includes a detecting unit that detects abnormal reading of the document read by the reading unit, an image storing unit that associates the image read by the reading unit and an abnormal reading result detected by the detecting unit with a reading order of the document to store in the storage unit, a separation stacking unit that controls the ejecting unit to separate the document in which the abnormal reading is detected by the detecting unit and the document in which the abnormal reading is not detected to eject to the stacking unit, a rereading unit that allows the reading unit to read again the document in which the abnormal reading is detected by the detecting unit separated by the separation stacking unit and ejected to the stacking unit, thereby obtaining a reread image, and an image replacing unit that replaces the image corresponding to the reading order stored by the image storing unit with the reread image obtained by the rereading unit.

An image reading method according to another aspect of the present invention is executed by an image reading apparatus, including a hopper unit on which a document is set, a separating unit that separates the document set on the hopper unit one by one, a reading unit that reads an image of the document separated by the separating unit, an ejecting unit that ejects the document read by the reading unit, a stacking unit that stacks the document ejected by the ejecting unit, a control unit, and a storage unit, and the method includes a detecting step of detecting abnormal reading of the document read by the reading unit, an image storing step of associating the image read by the reading unit and an abnormal reading result detected at the detecting step with a reading order of the document to store in the storage unit, a separation stacking step of controlling the ejecting unit to separate the document in which the abnormal reading is detected at the detecting step and the document in which the abnormal reading is not detected to eject to the stacking unit, a rereading step of allowing the reading unit to read again the document in which the abnormal reading is detected at the detecting step separated at the separation stacking step and ejected to the stacking unit, thereby obtaining a reread image, and an image replacing step of replacing the image corresponding to the reading order stored at the image storing step with the reread image obtained at the rereading step, wherein the steps are executed by the control unit.

A computer program product having a computer readable medium according to still another aspect of the present invention includes programmed instructions for an image reading method executed by an image reading apparatus, including a hopper unit on which a document is set, a separating unit that separates the document set on the hopper unit one by one, a reading unit that reads an image of the document separated by the separating unit, an ejecting unit that ejects the document read by the reading unit, a stacking unit that stacks the document ejected by the ejecting unit, a control unit, and a storage unit, wherein the instructions, when executed by a computer, cause the computer to perform a detecting step of detecting abnormal reading of the document read by the reading unit, an image storing step of associating the image read by the reading unit and an abnormal reading result detected at the detecting step with a reading order of the document to store in the storage unit, a separation stacking step of controlling the ejecting unit to separate the document in which the abnormal reading is detected at the detecting step and the document in which the abnormal reading is not detected to eject to the stacking unit, a rereading step of allowing the reading unit to read again the document in which the abnormal reading is detected at the detecting step separated at the separation stacking step and ejected to the stacking unit, thereby obtaining a reread image, and an image replacing step of replacing the image corresponding to the reading order stored at the image storing step with the reread image obtained at the rereading step.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a flowchart showing one example of an image reading processing according to the embodiment;

FIG. 7 is a flowchart showing one example of a document alignment processing executed by the image reading apparatus according to the embodiment;

FIG. 8A is a view showing one example of an alignment of document in the document alignment processing according to the embodiment;

FIG. 8B is a view showing one example of an alignment of document in the document alignment processing according to the embodiment;

FIG. 8C is a view showing one example of an alignment of document in the document alignment processing according to the embodiment;

FIG. 9 is a flowchart showing one example of a multi fed document reading processing of the image reading apparatus according to the embodiment;

FIG. 10 is a flowchart showing one example of the multi fed document reading processing of the image reading apparatus according to the embodiment;

DETAILED DESCRIPTION OF THE PREFERRED EMBODIMENTS

An embodiment of an image reading apparatus, an image reading method, and a computer program product according to the present invention will be explained below in detail based on the drawings. The embodiment does not limit the invention.

The invention has schematically following basic features. That is to say, the invention is the image reading apparatus comprising a hopper unit on which a document is set, a separating unit that separates the document set on the hopper unit one by one, a reading unit that reads an image of the document separated by the separating unit, an ejecting unit that ejects the document read by the reading unit, a stacking unit that stacks the document ejected by the ejecting unit, a control unit, and a storage unit.

[Configuration of Image Reading Apparatus 100]

Figure 1:
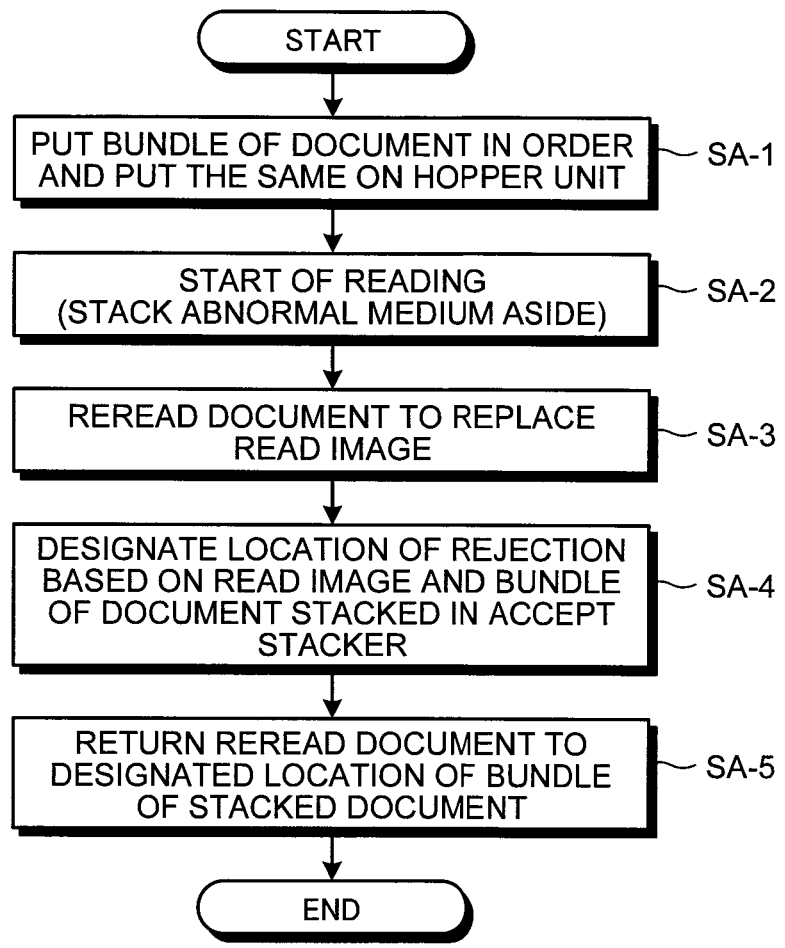
FIG. 1 is a flowchart showing one example of an image reading processing in conventional art.
Figure 2:
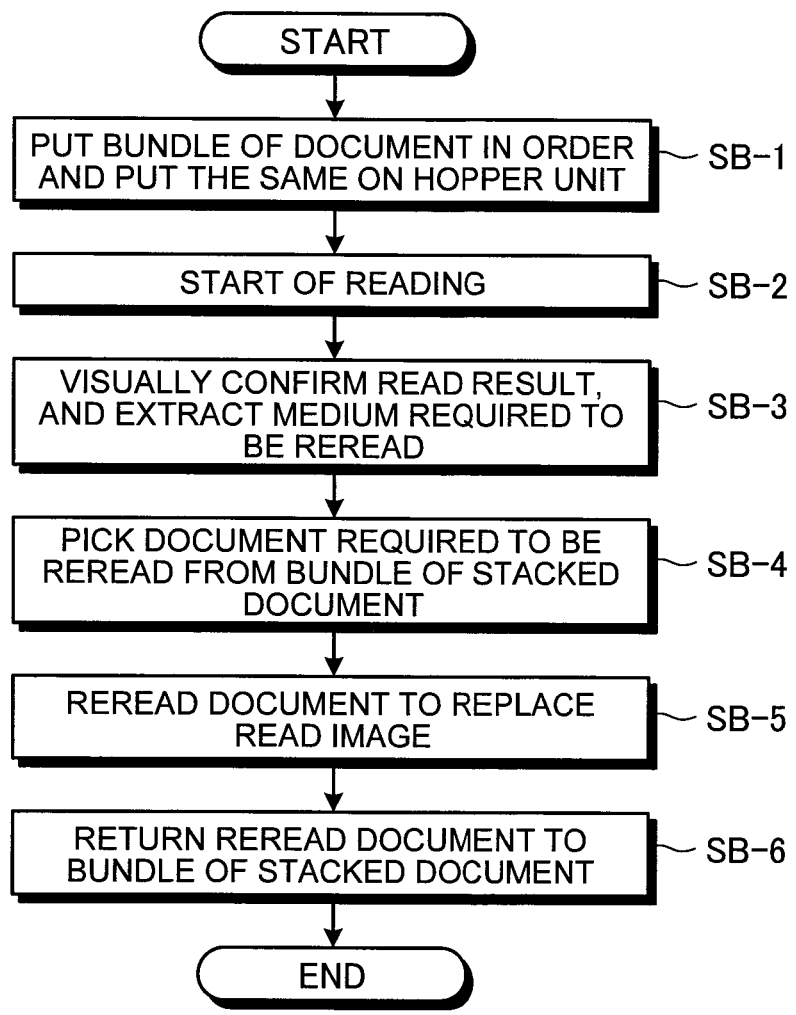
FIG. 2 is a flowchart showing one example of an image reading processing in conventional art.
Figure 3:
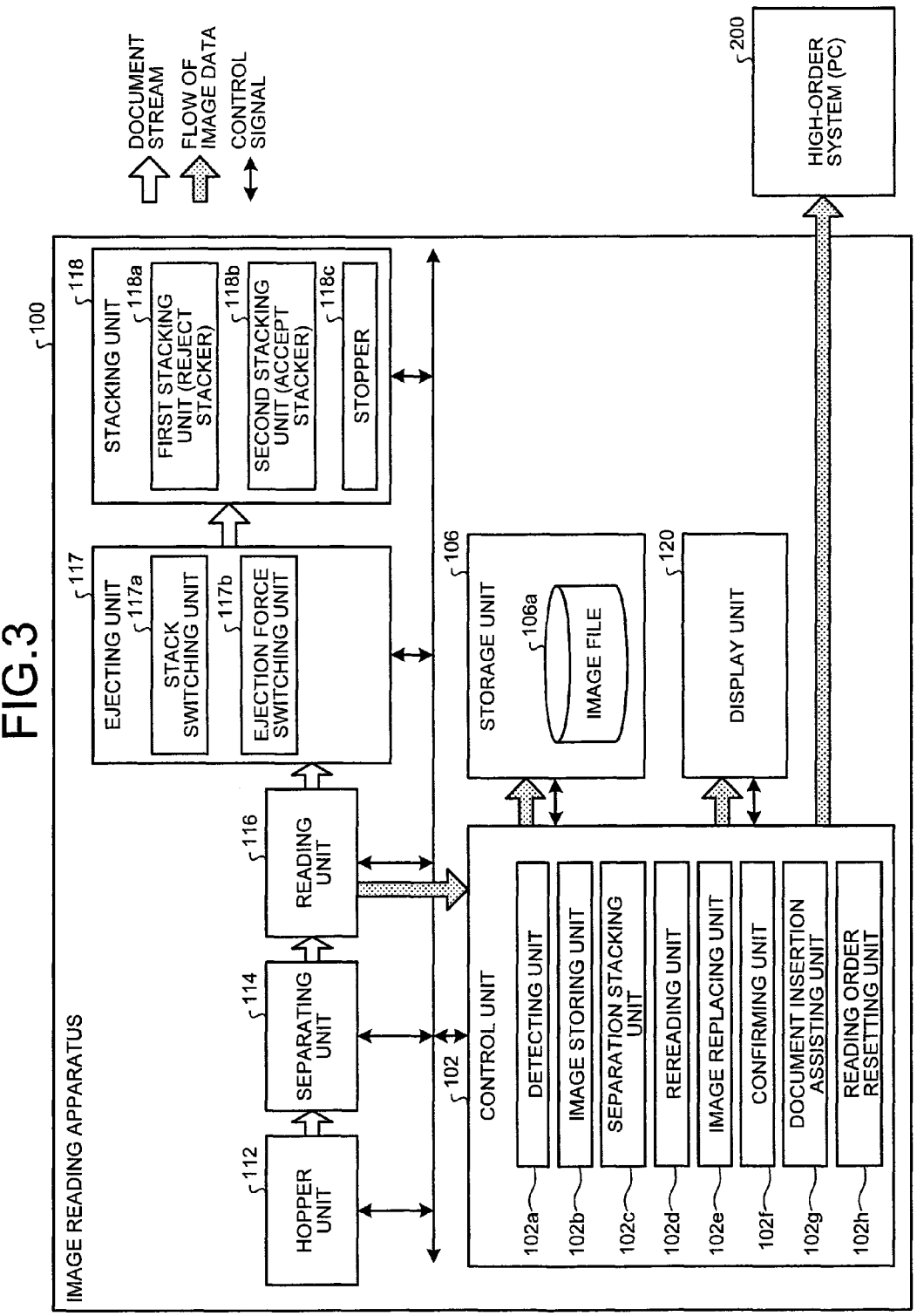
FIG. 3 is a block diagram showing one example of a configuration of an image reading apparatus according to the embodiment.
Figure 4:
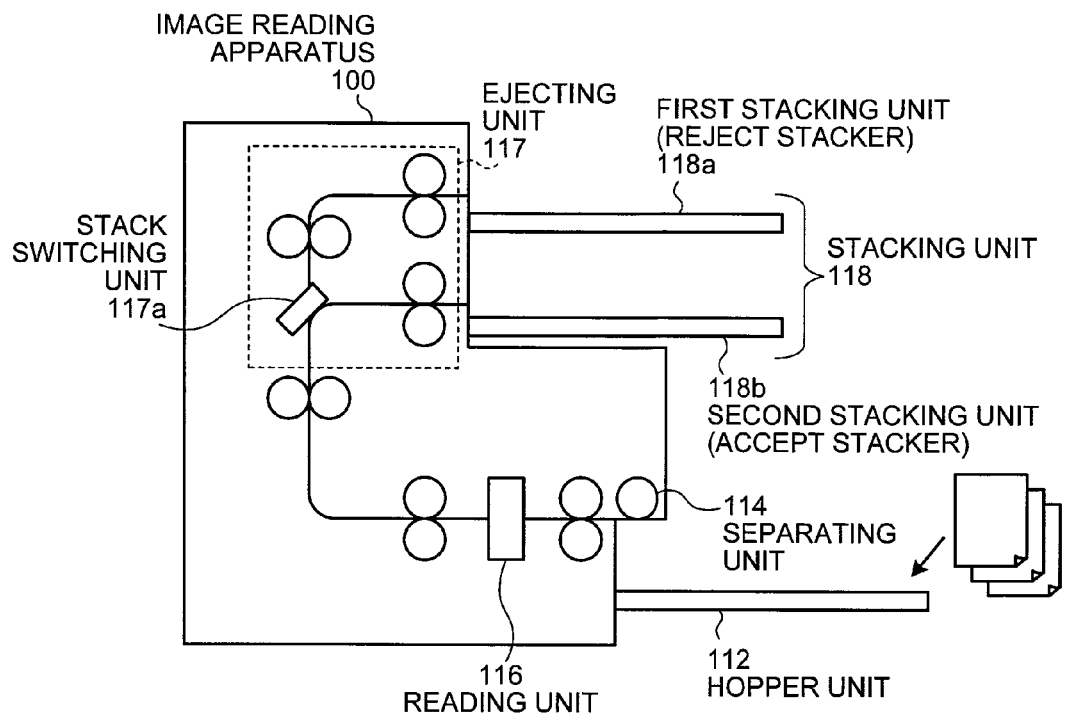
FIG. 4 is a block diagram showing one example of a configuration of the image reading apparatus according to the embodiment.
Figure 5:
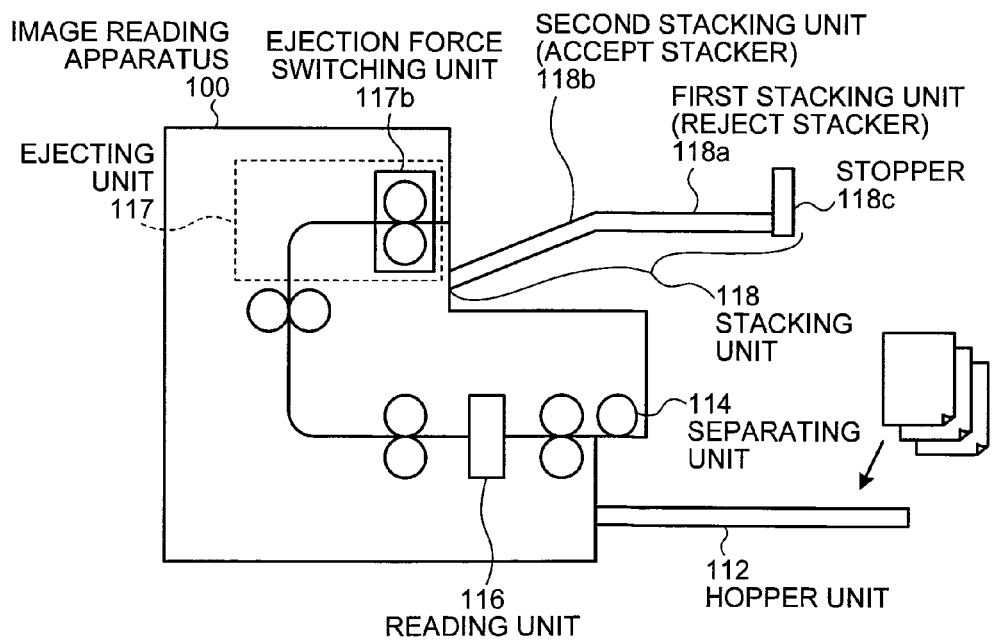
FIG. 5 is a block diagram showing one example of a configuration of the image reading apparatus according to the embodiment.
Figure 8D:
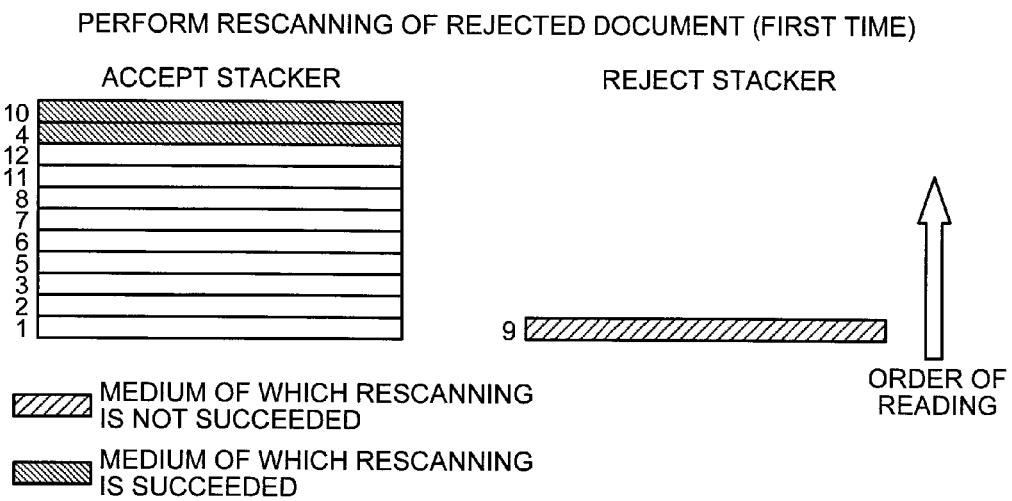
FIG. 8D is a view showing one example of an alignment of document in the document alignment processing according to the embodiment.
Figure 8E:
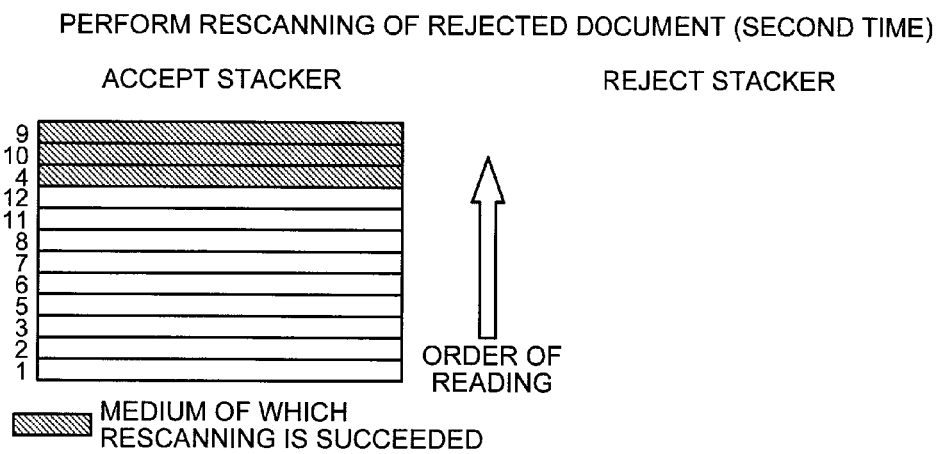
FIG. 8E is a view showing one example of an alignment of document in the document alignment processing according to the embodiment.
Figure 8F:
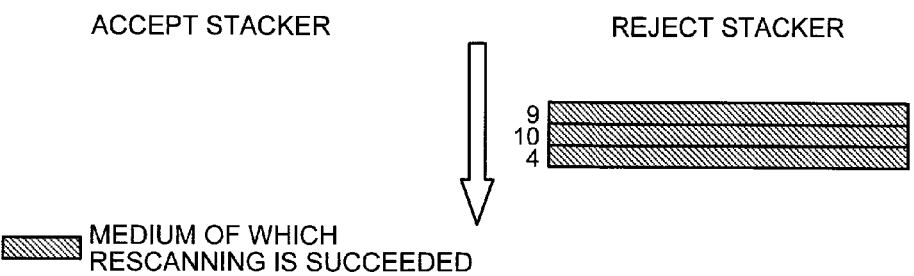
FIG. 8F is a view showing one example of an alignment of document in the document alignment processing according to the embodiment.
Figure 8G:
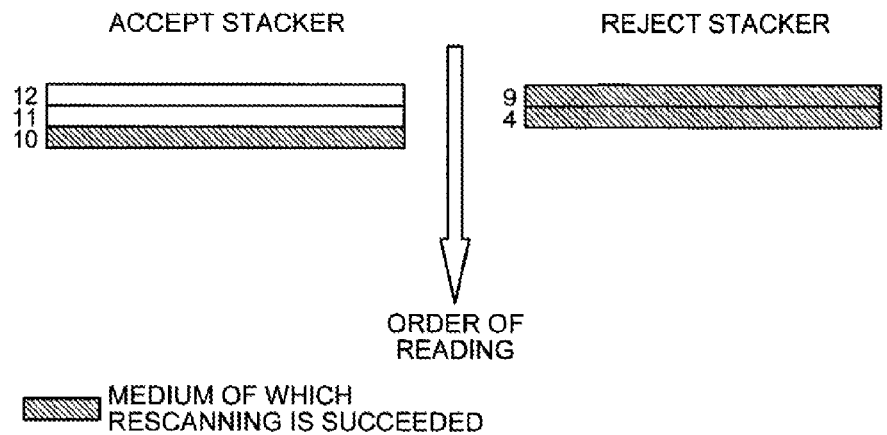
FIG. 8G is a view showing one example of an alignment of document in the document alignment processing according to the embodiment.
Figure 8H:
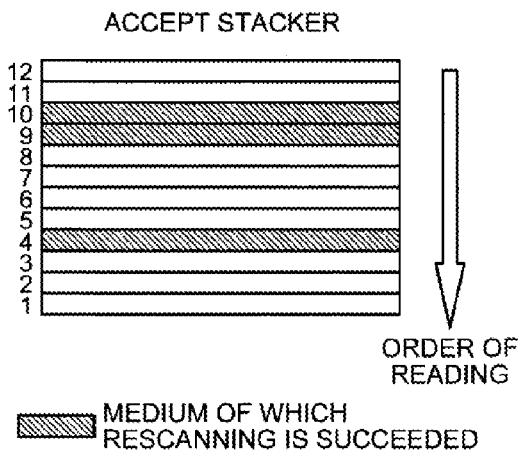
FIG. 8H is a view showing one example of an alignment of document in the document alignment processing according to the embodiment.
Figure 11A:
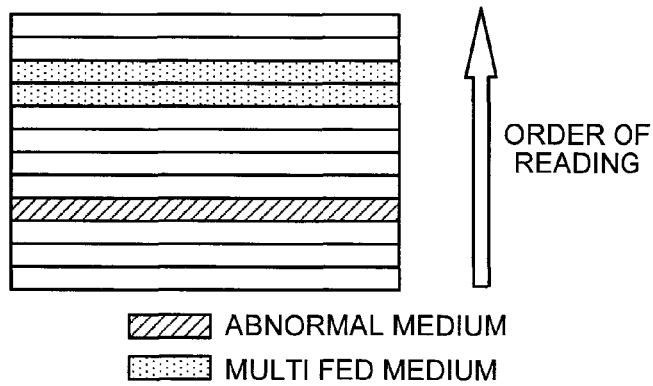
FIG. 11A is a view showing one example of an alignment of document in the multi fed document reading processing according to the embodiment.
Figure 11B:
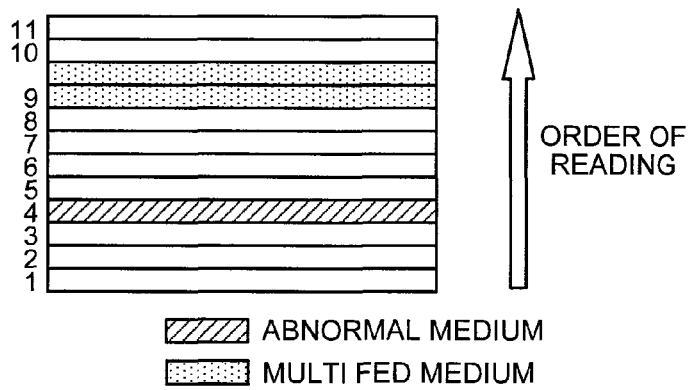
FIG. 11B is a view showing one example of an alignment of document in the multi fed document reading processing according to the embodiment.
Figure 11C:
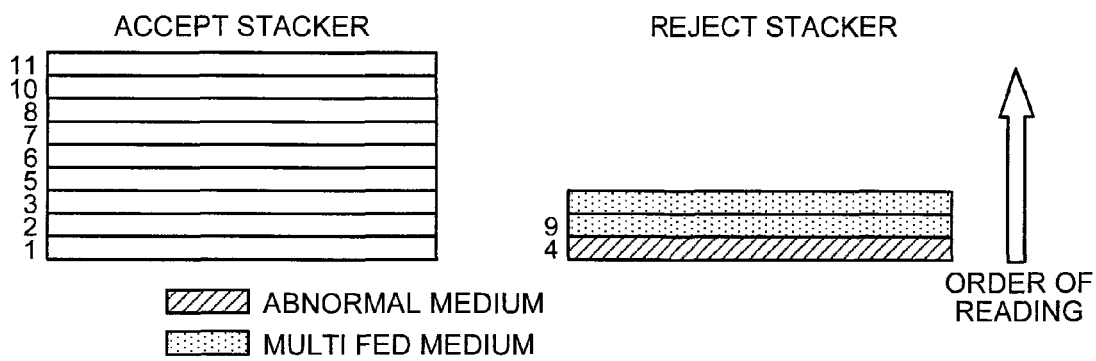
FIG. 11C is a view showing one example of an alignment of document in the multi fed document reading processing according to the embodiment.
Figure 11D:
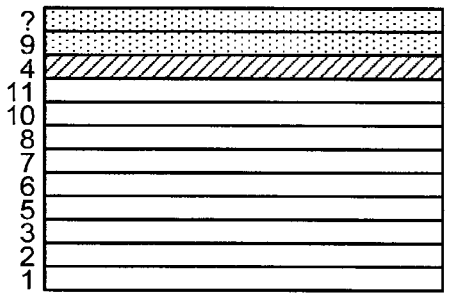
FIG. 11D is a view showing one example of an alignment of document in the multi fed document reading processing according to the embodiment.
Figure 11E:
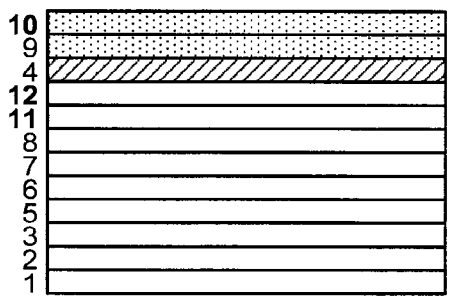
FIG. 11E is a view showing one example of an alignment of document in the multi fed document reading processing according to the embodiment.

Referring to FIGS. 3 to 5, configuration of the image reading apparatus 100 according to the embodiment will be explained.

[Basic Configuration]

Referring to FIG. 3, basic configuration of the image reading apparatus 100 will be explained. FIG. 3 is a block diagram showing one example of a configuration of an image reading apparatus according to the embodiment, and conceptually shows only parts related to the present invention.

In FIG. 3, in general, the image reading apparatus 100 is provided with a control unit 102, a storage unit 106, a hopper unit 112, a separating unit 114, a reading unit 116, an ejecting unit 117, a stacking unit 118, and a display unit 120. Here, the control unit 102 is a central processing unit (CPU) or the like that integrally controls the image reading apparatus 100. The storage unit 106 is a device that stores various databases and tables. The units composing the image reading apparatus 100 are communicatably connected through an optional communication channel. The image reading apparatus 100 may be communicatably connected a network (not shown) via a communication control interface (not shown), and may be communicatably connected to a high-order system (PC) 200 through this network (not shown). The high-order system (PC) 200 may be a server and the like, and hardware configuration of the high-order system (PC) 200 can be configured by an information processing device and the accessory devices such as existing personal computer, and workstation. The communication control interface (not shown) may control communication between the image reading apparatus 100 and the network (not shown). That is to say, the communication control interface (not shown) may have a function to communicate data to an external device such as the high-order system (PC) 200 through a communication line. The network (not shown) has function of connecting the image reading apparatus 100 with the external device such as the high-order system (PC) 200, and may include internet, public telephone network (including ordinary telephone network, and mobile telephone network), intranet, or the like.

The storage unit 106 is a storage unit such as a fixed disk device, and stores various databases, and various tables (an image file 106a and the like). Out of the respective components in the storage unit 106, the image file 106a is an image storage unit that stores an image read by the reading unit 116 and abnormal reading result detected by the control unit 102 with a reading order of the document.

The control unit 102 controls the hopper unit 112, the separating unit 114, the reading unit 116, the ejecting unit 117, the stacking unit 118, and the display unit 120 via control signals. The hopper unit 112 is a tray on which a document is set. The separating unit 114 is separating unit that separates the document set on the hopper unit 112 one by one. The reading unit 116 is a reading unit that reads an image of the document separated by the separating unit 114, and can use an image scanner such as a reflection type using reflected light, a transmission type using transmitted light, an infrared light type using infrared light, and the like. The ejecting unit 117 is an ejecting unit that ejects the document read by the reading unit 116. Out of the respective components in the ejecting unit 117, a stack switching unit 117a is a stack switching unit that switches to the first stacking unit or the second stacking unit to eject the document read by the reading unit 116. An ejection force switching unit 117b is an ejection force switching unit that switches ejection force when ejecting the document read by the reading unit 116 to the stacking unit 118. The stacking unit 118 is a stacking unit that stacks the document ejected by the ejecting unit 117. Out of the respective components in the stacking unit 118, a first stacking unit 118a is a stacking unit that stacks the document in which the abnormal reading is detected by the control unit 102. A second stacking unit 118b is a stacking unit that stacks the document in which the abnormal reading is not detected by the control unit 102. A stopper 118c is an arrangement unit that arranges documents ejected from the ejecting unit 117. The display unit 120 is a display unit that displays any one or both of the image of the document stored in the image file 106a and a reread image read by the control unit 102, and uses a display, monitor, and the like made of liquid crystal, organic electroluminescence, or the like.

In FIG. 3, the control unit 102 includes an internal memory that stores a control program such as an operating system (OS), programs specifying various processing procedures, and necessary data and performs information processing for executing various pieces of processing by using these programs. The control unit 102 functionally and conceptually includes a detecting unit 102a, an image storing unit 102b, a separation stacking unit 102c, a rereading unit 102d, an image replacing unit 102e, a confirming unit 102f, a document insertion assisting unit 102g, and a reading order resetting unit 102h.

Out of these units, the detecting unit 102a is a detecting unit that detects abnormal reading of the document read by the reading unit 116. The detecting unit 102a may also detect the abnormal reading by utilizing transmitted light. The detecting unit 102a may also detect bend and break of the document as the abnormal reading based on an outer shape of the document. The detecting unit 102a may also detect the abnormal reading based on a reading result of a bar-code attached to the document. The detecting unit 102a may also detect the abnormal reading based on an OCR result of a specific area of the document. The detecting unit 102a may also detect the abnormal reading based on a size of the document. The detecting unit 102a may also detect multi feeding of the document as the abnormal reading.

The image storing unit 102b is an image storing unit that associates the image read by the reading unit 116 and an abnormal reading result detected by the detecting unit 102a with a reading order of the document to store in the image file 106a. The image storing unit 102b may also store only the image corresponding to a first reading order out of redundantly read images due to the multi feeding when the multi feeding is detected by the detecting unit 102a.

The separation stacking unit 102c is a separation stacking unit that controls the ejecting unit 117 to separate the document in which the abnormal reading is detected by the detecting unit 102a and the document in which the abnormal reading is not detected to eject to the stacking unit 118. The separation stacking unit 102c may also control the stack switching unit 117a to eject the document in which the abnormal reading is detected by the detecting unit 102a to the first stacking unit 118a and eject the document in which the abnormal reading is not detected to the second stacking unit 118b. The separation stacking unit 102c may also control the ejection force of the ejection force switching unit 117b to stack the document in which the abnormal reading is detected by the detecting unit 102a and the document in which the abnormal reading is not detected to different positions of the stacking unit 118 (the first stacking unit 118a and the second stacking unit 118b).

The rereading unit 102d is a rereading unit that allows the reading unit 116 to read again the document in which the abnormal reading is detected by the detecting unit 102a separated by the separation stacking unit 102c and ejected to the stacking unit 118, thereby obtaining a reread image.

The image replacing unit 102e is an image replacing unit that replaces the image corresponding to the reading order stored by the image storing unit 102b with the reread image obtained by the rereading unit 102d. The image replacing unit 102e may also replace the image corresponding to the reading order stored by the image storing unit 102b with the reread image obtained by the rereading unit 102d when it is confirmed by the confirming unit 102f to replace with the reread image read by the rereading unit 102d. The image replacing unit 102e may also replace the image corresponding to the reading order stored by the image storing unit 102b with a redundant reread image obtained by the rereading unit 102d when obtaining the redundant reread image by the rereading unit 102d.

The confirming unit 102f is a confirming unit that allows a user to confirm whether to replace the image corresponding the reading order stored by the image storing unit 102b displayed on the display unit 120 with the reread image read by the rereading unit 102d by the image replacing unit 102e. The confirming unit 102f may also allow the user to confirm whether to replace the image corresponding to the reading order stored by the image storing unit 102b with a redundant reread image displayed on the display unit 120 by the image replacing unit 102e, when obtaining the redundant reread image by the rereading unit 102d.

The document insertion assisting unit 102g is a document insertion assisting unit that controls the separating unit 114, the reading unit 116, and the ejecting unit 117 to eject the document in which the abnormal reading is not detected to the stacking unit 118 until the reading order of the document in which the abnormal reading is detected, based on the reading order stored by the image storing unit 102b when the documents ejected to the stacking unit 118 separated into the document in which the abnormal reading is detected and the document in which the abnormal reading is not detected by the separation stacking unit 102c are returned again to the hopper unit 112, thereby indicating an insertion point of the document in which the abnormal reading is detected.

The reading order resetting unit 102h is a reading order resetting unit that resets the reading order when the image corresponding to the reading order stored by the image storing unit 102b is replaced with the redundant reread image obtained by the rereading unit 102d by the image replacing unit 102e. The reading order resetting unit 102h may also reset the reading order when it is confirmed to replace with the reread image read by the rereading unit 102d by the confirming unit 102f and the image corresponding to the reading order stored by the image storing unit 102b is replaced with the redundant reread image obtained by the rereading unit 102d by the image replacing unit 102e.

[Configuration 1]

Referring to FIG. 4, one example of a configuration of the image reading apparatus 100 provided with the stack switching unit 117a in the ejecting unit 117 according to the embodiment will be explained. FIG. 4 is a block diagram showing one example of a configuration of the image reading apparatus 100 according to the embodiment, and schematically shows only parts related to the present invention.

As shown in FIG. 4, the image reading apparatus 100 is provided with the hopper unit 112 on which a document is set, the separating unit 114 that separates the document set on the hopper unit 112 one by one, the reading unit 116 that reads an image of the document separated by the separating unit 114, the stacking unit 118 provided with the first stacking unit 118a (reject stacker) that stacks the document in which the abnormal reading is detected, and the second stacking unit 118b (accept stacker) that stacks the document in which the abnormal reading is not detected, and the ejecting unit 117 provided with the stack switching unit 117a that switches to the first stacking unit 118a (reject stacker) or the second stacking unit 118b (accept stacker) to eject the document read by the reading unit 116.

In FIG. 4, curved lines extending from the separating unit 114 to the first stacking unit 118a (reject stacker) and to the second stacking unit 118b (accept stacker) within the image reading apparatus 100 represent conveying paths of the document, and circular figures in the image reading apparatus 100 represent conveying rollers.

[Configuration 2]

Referring to FIG. 5, one example of a configuration of the image reading apparatus 100 provided with the ejection force switching unit 117b in the ejecting unit 117 according to the embodiment will be explained. FIG. 5 is a block diagram showing one example of a configuration of the image reading apparatus 100 according to the embodiment, and conceptually shows only parts related to the present invention.

As shown in FIG. 5, the image reading apparatus 100 is provided with the hopper unit 112 on which a document is set, the separating unit 114 that separates the document set on the hopper unit 112 one by one, the reading unit 116 that reads an image of the document separated by the separating unit 114, the ejecting unit 117 provided with the ejection force switching unit 117b that switches ejection force when ejecting the document read by the reading unit 116 to the stacking unit 118, and the stacking unit 118 provided with the first stacking unit 118a (reject stacker), the second stacking unit 118b (accept stacker), and the stopper 118c that arranges documents ejected from the ejection force switching unit 117b to stack separately the document in which the abnormal reading is detected and the document in which the abnormal reading is not detected to one stacking unit 118.

In FIG. 5, curved lines extending from the separating unit 114 to the first stacking unit 118a (reject stacker) and to the second stacking unit 118b (accept stacker) within the image reading apparatus 100 represent conveying paths of the document, and circular figures in the image reading apparatus 100 represent conveying rollers.

[Image Reading Processing]

One example of an image reading processing according to the embodiment will be explained below in detail with reference to FIGS. 6 to 11E.

[Basic Processing]

Referring to FIG. 6, one example of a basic processing of the image reading apparatus 100 according to the embodiment will be explained. FIG. 6 is a flowchart showing one example of an image reading processing according to the embodiment.

As shown in FIG. 6, a user puts a bundle of document in order and puts the same on the hopper unit 112 (step SC-1).

When reading of the document is started, the detecting unit 102a detects abnormal reading of the document read by the reading unit 116. The separation stacking unit 102c controls the ejecting unit 117 to separate the document in which the abnormal reading is detected by the detecting unit 102a and the document in which the abnormal reading is not detected to stack an abnormal medium (that is to say, the document in which the abnormal reading is detected) aside (for example, the first stacking unit 118a (reject stacker)). The image storing unit 102b associates the image read by the reading unit 116, i.e., a detection result of a read page in reading order of the document, and an abnormal reading result detected by the detecting unit 102a with a reading order of the document to store in the storage unit 106 (for example, the image file 106a) (step SC-2). The detecting unit 102a may also detect the abnormal reading by utilizing transmitted light. The detecting unit 102a may also detect bend and break of the document as the abnormal reading based on an outer shape of the document. The detecting unit 102a may also detect the abnormal reading based on a reading result of a bar-code attached to the document. The detecting unit 102a may also detect the abnormal reading based on an OCR result of a specific area of the document. The detecting unit 102a may also detect the abnormal reading based on a size of the document. The detecting unit 102a may also detect multi feeding of the document as the abnormal reading.

The rereading unit 102d performs rescanning of the abnormal medium (that is to say, the document in which the abnormal reading is detected by the detecting unit 102a) (that is to say, allows the reading unit 116 to read the document, thereby obtaining a reread image) (step SC-3).

The image replacing unit 102e replaces the reread image obtained by the rereading unit 102d with the data of the corresponding point (that is to say, the image corresponding to the reading order) by matching the page number of the rereading and the data in the storage unit 106 (for example, the abnormal reading result and the like stored in the image file 106a) (step SC-4).

The control unit 102 judges whether there is not a document in the first stacking unit 118a (reject stacker) (step SC-5).

When the control unit 102 judges that there is a document in the first stacking unit 118a (reject stacker) at the step SC-5 (step SC-5: No), this shifts the process to the step SC-3.

On the other hand, when the control unit 102 judges that there is not a document in the first stacking unit 118a (reject stacker) at the step SC-5 (step SC-5: Yes), this finishes the process.

[Document Alignment Processing]

Referring to FIG. 7, one example of a document alignment processing executed by the image reading apparatus 100 according to the embodiment will be explained. FIG. 7 is a flowchart showing one example of a document alignment processing executed by the image reading apparatus 100 according to the embodiment.

First, the user puts a bundle of documents of which reading process is completed (for example, a bundle obtained by stacking the documents in which the abnormal reading is detected arranged in order of ejection following the documents in which the abnormal reading is not detected arranged in order of reading) on the stacker (that is to say, the stacking unit 118) on the hopper unit 112 by reversing a page order thereof (step SD-1).

The control unit 102 starts reading the bundle of documents (paper feeding) to calculate the number of sheets rejected (that is to say, in which the abnormal reading is detected) by the detecting unit 102a at the time of first reading based on the data in the storage unit 106 (for example, the image file 106a) (step SD-2).

The control unit 102 judges whether the paper feeding (that is to say, ejection to the first stacking unit 118a (reject stacker)) of the rejected document is finished based on the number of sheets calculated at the step SD-2 (step SD-3).

When the control unit 102 judges that the paper feeding of the rejected document is not finished at the step SD-3 (step SD-3: No), this shifts the process to the step SD-2.

On the other hand, when the control unit 102 judges that the paper feeding of the rejected document is finished at the step SD-3 (step SD-3: Yes), this judges whether there is not the document in the first stacking unit 118a (reject stacker) (step SD-4).

When it is judged that there is the document in the first stacking unit 118a (reject stacker) at the step SD-4 (step SD-4: No), the document insertion assisting unit 102g controls the separating unit 114, the reading unit 116, and the ejecting unit 117 to eject the document in which the abnormal reading is not detected to the stacking unit 118 until a page number of the rejected page (that is to say, the reading order of the document in which the abnormal reading is detected) based on data in the storage unit 106 (that is to say, the reading order of the document stored by the image storing unit 102b), and performs the paper feeding and stops (step SD-5).

The document insertion assisting unit 102g indicates the page number (that is to say, an insertion point) of the corresponding document (for example, displays the image of the corresponding document on the display unit 120) out of the bundle of rejected documents (that is to say, the documents in which the abnormal reading is detected), and allows the user to add the corresponding page to the hopper unit 112 (step SD-6).

On the other hand, when the control unit 102 judges that there is no document in the first stacking unit 118a (reject stacker) at the step SD-4 (step SD-4: Yes), this finishes the process.

Referring to (A1) to (A8) in FIGS. 8A to 8H, one example of an alignment of document in the document alignment processing according to the embodiment will be explained. FIGS. 8A to 8H are views showing one example of an alignment of document in the document alignment processing according to the embodiment.

(A1) A user puts a bundle of document of which reading is not started (that is to say, a bundle of document in which there are abnormal media) in order and puts the same on the hopper unit 112 (for example, corresponding to the step SC-1 in FIG. 6).

(A2) The image storing unit 102b numbers data read at a time by the reading unit 116, and stores a detection state (for example, the image read by the reading unit 116, and the abnormal reading result of the document detected by the detecting unit 102a) in the storage unit 106 (for example, the image file 106a) (for example, corresponding to the step SC-2 in FIG. 6).

(A3) The separation stacking unit 102c controls the ejecting unit 117 to separate the documents into two stackers such that an abnormal medium (that is to say, the document in which the abnormal reading is detected by the detecting unit 102a) is to the first stacking unit 118a (reject stacker) and the document in which the abnormal reading is not detected by the detecting unit 102a is to the second stacking unit 118b (accept stacker), and stacks abnormal media (that is to say, the documents 4, 9, and 10) in the first stacking unit 118a (reject stacker) (for example, corresponding to the step SC-2 in FIG. 6).

(A4) The rereading unit 102d performs first rescanning of the rejected document (that is to say, the abnormal medium in which the abnormal reading is detected by the detecting unit 102a ejected to the first stacking unit 118a (reject stacker) by the separation stacking unit 102c). The ejecting unit 117 ejects a medium (document) of which rescanning is succeeded to the second stacking unit 118b (accept stacker), and a medium (document) of which rescanning is not succeeded to the first stacking unit 118a (reject stacker) (for example, corresponding to the step SC-3 in FIG. 6).

(A5) When the control unit 102 judges that there is the document in the first stacking unit 118a (reject stacker) (for example, corresponding to step SC-5: No in FIG. 6), the rereading unit 102*d* performs rescanning of the rejected document (that is to say, the abnormal medium 9) for a second time. The ejecting unit 117 ejects the medium (document) of which rescanning is succeeded to the second stacking unit 118*b* (accept stacker) (for example, corresponding to the step SC-3 in FIG. 6).

(A6) When the user puts the bundle of documents of which reading process is completed (for example, the bundle obtained by stacking the documents in which the abnormal reading is detected arranged in order of ejection following the documents in which the abnormal reading is not detected arranged in order of reading) on the second stacking unit 118*b* (accept stacker) on the hopper unit 112 upside down (that is to say, such that the page order is reversed) (for example, corresponding to the step SD-1 in FIG. 7), the control unit 102 ejects the medium required to be sorted (that is to say, the document in which the abnormal reading is detected by the detecting unit 102*a* at the time of first reading) to the first stacking unit 118*a* (reject stacker) (for example, corresponding to the step SD-3 in FIG. 7).

(A7) The document insertion assisting unit 102*g* controls the separating unit 114, the reading unit 116, and the ejecting unit 117 to eject the document in which the abnormal reading is not detected to the stacking unit 118 to stop the scanning (for example, corresponding to the step SD-5 in FIG. 7) at a point of the rejected document (of which rescanning is succeeded) (that is to say, the reading order of the document in which the abnormal reading is detected), based on the reading order stored by the image storing unit 102*b*, displays the corresponding page number and the image in the first stacking unit 118*a* (reject stacker) on the display unit 120 (that is to say, indicates the insertion point of the document in which the abnormal reading is detected) (for example, corresponding to the step SD-6 in FIG. 7), allows the user to add the corresponding page to the hopper unit 112, and continuously reads until there is no more document on the hopper unit 112.

(A8) The document insertion assisting unit 102*g* performs the similar process until there is no more document on the hopper unit 112, and when it is judged that there is no document in the first stacking unit 118*a* (reject stacker) (corresponding to step SD-4: Yes in FIG. 7), that is to say, when all of the documents are ejected to the second stacking unit 118*b* (accept stacker) in the first reading order, this finishes the process.

[Multi Fed Document Reading Processing]

Next, Referring to FIGS. 9 to 11, one example of a multi fed document reading processing according to the embodiment will be explained below in detail.

[Multi Fed Document Reading Processing 1 (Automatic)]

Referring to FIG. 9, one example of a multi fed document reading processing of the image reading apparatus 100 according to the embodiment will be explained. FIG. 9 is a flowchart showing one example of a multi fed document reading processing of the image reading apparatus 100 according to the embodiment.

As shown in FIG. 9, the control unit 102 judges whether there is not the document in the first stacking unit 118*a* (reject stacker) (step SE-1).

When it is judged that there is no document in the first stacking unit 118*a* (reject stacker) at the step SE-1 (step SE-1: Yes), the control unit 102 finishes the process.

On the other hand, when it is judged that there is the document in the first stacking unit 118*a* (reject stacker) at the step SE-1 (step SE-1: No), the rereading unit 102*d* rereads the document in the first stacking unit 118*a* (reject stacker) (that is to say, the document in which the abnormal reading is detected by the detecting unit 102*a*) by the reading unit 116 to obtain the reread image (step SE-2).

The detecting unit 102*a* detects whether there is multi feeding of the document read by the reading unit 116 (step SE-3).

When it is detected that there is the multi feeding of the document at the step SE-3 (step SE-3: Yes), the image replacing unit 102*e* compares (matches) the image of the abnormal medium following the multi fed media of a first reread image obtained by the rereading unit 102*d* and the image after the reread multi fed media, and replaces the page (that is to say, a redundant reread image obtained by the rereading unit 102*d*) to insert to a point of multi feeding of the image stored in the image file 106*a* (that is to say, a position of the image corresponding to the reading order stored by the image storing unit 102*b*) until they are judged to be the identical image (step SE-4).

When the multi feeding of the document is not detected at the step SE-3 (step SE-3: No) or when the replacement of the image of the multi fed media is completed at the step SE-4, the image replacing unit 102*e* replaces the image of the abnormal medium obtained by the rereading unit 102*d* with the data of the corresponding point (that is to say, the reread image obtained by the rereading unit 102*d*) by matching the page number of the rereading and the data in the storage unit 106 (for example, the abnormal reading result and the like stored in the image file 106*a*), and returns the process to the step SE-1 (step SE-5). When the replacement is completed by the image replacing unit 102*e*, the reading order resetting unit 102*h* may reset the reading order.

[Multi Fed Document Reading Processing 2 (Manual)]

Referring to FIG. 10, one example of a multi fed document reading processing of the image reading apparatus 100 according to the embodiment will be explained. FIG. 10 is a flowchart showing one example of a multi fed document reading processing of the image reading apparatus 100 according to the embodiment.

As shown in FIG. 10, the control unit 102 judges whether there is not the document in the first stacking unit 118*a* (reject stacker) (step SF-1).

When it is judged that there is no document in the first stacking unit 118*a* (reject stacker) at the step SF-1 (step SF-1: Yes), the control unit 102 finishes the process.

On the other hand, when it is judged that there is the document in the first stacking unit 118*a* (reject stacker) at the step SF-1 (step SF-1: No), the rereading unit 102*d* rereads the document in the first stacking unit 118*a* (reject stacker) (that is to say, the document in which the abnormal reading is detected by the detecting unit 102*a*) by the reading unit 116 to obtain the reread image (step SF-2).

The detecting unit 102*a* detects whether there is multi feeding of the document read by the reading unit 116 (step SF-3).

When the multi feeding of the document is detected at the step SF-3 (step SF-3: Yes), the confirming unit 102*f* displays the image at the time of the multi feeding of the first reread image obtained by the rereading unit 102*d* (that is to say, the image of the multi fed media) and the image of the abnormal medium following the multi fed media on the display unit 120, and allows the user to confirm whether to replace the image corresponding to the reading order stored in the image storing unit 102*b* with the image of the multi fed media by the image replacing unit 102*e* (step SF-4).

The user (operator) designates the replacement of the multi fed page (that is to say, the image of the multi fed media) (step SF-5).

When the multi feeding of the document is not detected at the step SF-3 (step SF-3: No) or when the user designates the replacement of the image of the multi fed media at the step SF-5, the image replacing unit 102e matches the page number of rereading and the data in the storage unit 106 (for example, the reading order and the like stored in the image file 106a), replaces the image corresponding to the reading order stored by the image storing unit 102b with the data of the corresponding point designated by the operator at the step SF-5 (that is to say, the redundant reread image obtained by the rereading unit 102d), replaces the image of the abnormal medium obtained by the rereading unit 102d with the data of the corresponding point (that is to say, the reread image obtained by the rereading unit 102d), and returns the process to the step SF-1 (step SF-6). The reading order resetting unit 102h may reset the reading order when the replacement is completed by the image replacing unit 102e.

Referring to (B1) to (B5) in FIGS. 11A to 11E, one example of an alignment of document in the multi fed document reading processing 2 according to the embodiment will be explained. FIGS. 11A to 11E are views showing one example of an alignment of document in the multi fed document reading processing according to the embodiment.

(B1) A user puts a bundle of document of which reading is not started (that is to say, a bundle of document in which there are abnormal media and multi fed media) in order and puts the same on the hopper unit 112.

(B2) The image storing unit 102b numbers data read at a time by the reading unit 116, and stores a detection state (for example, the image read by the reading unit 116, and the abnormal reading result of the document detected by the detecting unit 102a) in the image file 106a. When the multi feeding is detected by the detecting unit 102a, the image storing unit 102b counts the multi fed media as one medium and stores only the image corresponding to the first reading order out of the images of the multi fed medium redundantly read due to the multi feeding in the image file 106a.

(B3) The separation stacking unit 102c controls the ejecting unit 117 to separate the documents into two stackers such that an abnormal medium or a multi fed medium (that is to say, the document in which the abnormal reading is detected by the detecting unit 102a) is to the first stacking unit 118a (reject stacker) and the document in which the abnormal reading is not detected by the detecting unit 102a is to the second stacking unit 118b (accept stacker), and ejects the abnormal medium (that is to say, the document 4) and the multi fed medium (that is to say, the document 9) in the first stacking unit 118a (reject stacker).

(B4) The rereading unit 102d performs rescanning of the rejected document (that is to say, the abnormal medium or the multi fed medium in which the abnormal reading is detected by the detecting unit 102a ejected to the first stacking unit 118a (reject stacker) by the separation stacking unit 102c), and when this is normally read by the reading unit 116, this is ejected to the second stacking unit 118b (accept stacker), and when the abnormal reading is detected again by the reading unit 116, this is ejected to the first stacking unit 118a (reject stacker) (for example, corresponding to the step SF-2 in FIG. 10). The detecting unit 102a detects whether there is the multi feeding of the document read by the reading unit 116 (for example, corresponding to the step SF-3 in FIG. 10).

(B5) When the multi feeding of the document is detected by the detecting unit 102a (for example, corresponding to step SF-3: Yes in FIG. 10), the confirming unit 102f allows the user to confirm whether to replace the image corresponding to the reading order stored by the image storing unit 102b with the multi fed medium following the page in which the multi feeding is detected (for example, the step SF-4 in FIG. 10), and allows (the user) to designate the insertion point using the display unit 120 (for example, corresponding to the step SF-5 in FIG. 10).

[Other Embodiments]

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

For example, in the embodiment, the image reading apparatus 100 performs various processes as a stand-alone device. However, the image reading apparatus 100 can be configured to perform processes in response to request from a client terminal, which is a separate unit, and return the process results to the client terminal.

All the automatic processes explained in the present embodiment can be, entirely or partially, carried out manually. Similarly, all the manual processes explained in the present embodiment can be, entirely or partially, carried out automatically by a known method.

The process procedures, the control procedures, specific names, information including registration data for each process and various parameters such as search conditions, display example, and database construction, mentioned in the description and drawings can be changed as required unless otherwise specified.

The constituent elements of the image reading apparatus 100 are merely conceptual and may not necessarily physically resemble the structures shown in the drawings.

For example, the process functions performed by each device of the image reading apparatus 100, especially the each process function performed by the control unit 102, can be entirely or partially realized by CPU and a computer program executed by the CPU or by a hardware using wired logic. The computer program, recorded on a recording medium to be described later, can be mechanically read by the image reading apparatus 100 as the situation demands. In other words, the storage unit 106 such as read-only memory (ROM) or hard disk (HD) stores the computer program that can work in coordination with an operating system (OS) to issue commands to the CPU and cause the CPU to perform various processes. The computer program is first loaded to the random access memory (RAM), and forms the control unit 102 in collaboration with the CPU.

Alternatively, the computer program can be stored in any application program server connected to the image reading apparatus 100 via the network, and can be fully or partially loaded as the situation demands.

The computer-readable recording medium on which the computer program can be stored may be a flexible disk, magneto optic (MO) disk, ROM, erasable programmable ROM (EPROM), electrically erasable programmable ROM (EEPROM), compact disk-read-only memory (CD-ROM), digital versatile disk (DVD), Blu-ray Disc.

Computer program refers to a data processing method written in any computer language and written method, and can have software codes and binary codes in any format. The computer program can be a dispersed form in the form of a plurality of modules or libraries, or can perform various functions in collaboration with a different program such as the OS. Any known configuration in the each device according to the embodiment can be used for reading the recording medium. Similarly, any known process procedure for reading or installing the computer program can be used.

The storage unit 106 is a fixed disk device such as RAM, ROM, SSD, and HD or flexible disk, optical disk, and stores therein various programs, tables, databases, and files required for various processes.

The image reading apparatus 100 can also be connected to any existing personal computer, workstation, etc. and can be operated by executing software (that includes computer program, data, etc.) that implements the method according to the present invention in the personal computer or workstation.

The distribution and integration of the device are not limited to those illustrated in the figures. The device as a whole or in parts can be functionally or physically distributed or integrated in an arbitrary unit according to various attachments or how the device is to be used.

The present invention is made in consideration of the above-described problems, and an object thereof is to provide the image reading apparatus, an image reading method, and a program capable of ejecting rejected document separately from the normally read document, returning the reread document to the bundle of documents in original order of documents, and of reducing time required for the process.

The present invention automatically searches the document required to be reread and rereads the same even when the image of which reading is failed is mixed due to the scanning error, so that this has an effect of efficiently obtaining scanning data of the document in the reading order.

The present invention has an effect that the user may easily confirm the read data.

The present invention has an effect that the user may obtain the data while confirming the replacement of the image.

The present invention may easily sort the read documents in order after the rereading due to the scanning error, so that this has an effect of efficiently returning the reread documents to the original order thereof without staining them and without stopping reading the image.

The present invention may read the document, which is read with difficulty by the image reading apparatus utilizing the reflected light, so that this has an effect of improving detection accuracy of the image.

The present invention may detect a physical state of the document, so that this has an effect of detecting the document required to be reread with higher accuracy.

The present invention may detect information attached to the document in advance, so that this has an effect of detecting the document required to be reread with higher accuracy.

The present invention may detect deformation and the like of a character in the read image, so that this has an effect of detecting the document required to be reread with higher accuracy.

The present invention may detect even when a note is inserted between the documents, so that this has an effect of detecting the document required to be reread with higher accuracy.

The present invention has an effect of detecting the identical page redundantly inserted in the documents.

The present invention has an effect of creating document data without the redundant page.

The present invention has an effect of automatically creating the document data of the originally read documents including the redundant page.

The present invention has an effect of creating the document data of the originally read documents including the redundant page according to judgment by the user.

The present invention is provided with the first stacking unit (reject stacker) to sort the documents required to be reread (for example, the multi fed documents) to eject the reject stacker, so that this has an effect that the user may easily recognize the document required to be reread.

The present invention has an effect of sorting the normally read document and the document required to be reread even when the image reading apparatus is provided with only one stacker.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus, comprising:
a hopper unit configured to have a document with a plurality of pages placed thereon;
a separating unit configured to separate the plurality of pages of the document placed on the hopper unit;
a reading unit configured to read an image on the plurality of pages of the document separated by the separating unit;
an ejecting unit configured to eject the plurality of pages of the document after reading the image by the reading unit,
a stacking unit configured to stack the plurality of pages of the document ejected by the ejecting unit;
a control unit; and
a storage unit,
wherein the control unit includes
a detecting unit configured to detect multiple feeding of the document as abnormal reading of the document by the reading unit,
an image storing unit configured to count multiple-fed pages as one page and to store only an image of the plurality of pages of the document corresponding to a reading order when the multiple feeding is detected by the detecting unit,
a separation stacking unit configured to control the ejecting unit to separately eject at least one page of the document for which the abnormal reading is detected by the detecting unit and at least one page of the document for which the abnormal reading is not detected to the stacking unit,
a rereading unit configured to cause the reading unit to read again the image on the at least one page of the document, for which the abnormal reading is detected by the detecting unit and which is separately ejected under control of the separation stacking unit to the stacking unit, to obtain a reread image,
an image replacing unit configured to replace the image of the page of the document stored by the image storing unit, which corresponds to the reading order, with the reread image obtained by the rereading unit when the reread image is obtained by the rereading unit, and
a reading order resetting unit configured to reset the reading order when the image of the page of the document stored by the image storing unit is replaced, by the image replacing unit, with the reread image obtained by the rereading unit, considering actual pages of the multiple-fed pages,
wherein the reading order resetting unit is configured to revive page numbers of the multiple-fed pages and to reset a page number of a document following the multi-fed documents based on the revived page numbers of the multiple-fed pages so as to allow the reset reading order to be the same as an order of the plurality of pages of the document placed on the hopper unit.

2. The image reading apparatus according to claim 1, further comprising:
a display unit configured to display any one or both of the image of the plurality of pages of the document stored by the image storing unit and the reread image read by the rereading unit.

3. The image reading apparatus according to claim 2, wherein
the control unit further includes a confirming unit configured to allow a user to confirm whether to replace the image of the page of the document stored by the image storing unit displayed on the display unit with the reread image obtained by the rereading unit, and
the image replacing unit is configured to replace the image of the page of the document stored by the image storing unit with the reread image obtained by the rereading unit upon confirmation by the confirming unit.

4. The image reading apparatus according to claim 3, wherein
the confirming unit is configured to allow the user to confirm whether to replace the image of the pages of the document stored by the image storing unit with the reread image displayed on the display unit, when the reread image is obtained by the rereading unit, and
the reading order resetting unit is configured to reset the reading order when the image of the page of the document stored by the image storing unit is replaced, by the image replacing unit, with the reread image obtained by the rereading unit.

5. The image reading apparatus according to claim 1, wherein the control unit further includes a document insertion assisting unit configured to control the separating unit, the reading unit, and the ejecting unit to eject the plurality of pages of the document, in which the abnormal reading is not detected, to the stacking unit until the reading order of the document, in which the abnormal reading is detected, based on the reading order stored by the image storing unit when the plurality of pages of the documents ejected to the stacking unit separated into the plurality of pages of the document in which the abnormal reading is detected and the plurality of pages of the document in which the abnormal reading is not detected by the separation stacking unit are returned again to the hopper unit to indicate an insertion point of the document in which the abnormal reading is detected.

6. The image reading apparatus according to claim 1, wherein the detecting unit is configured to detect the abnormal reading by utilizing transmitted light.

7. The image reading apparatus according to claim 1, wherein the detecting unit is configured to detect bend and break of the plurality of pages of the document as the abnormal reading based on an outer shape of the plurality of pages of the document.

8. The image reading apparatus according to claim 1, wherein
the image on the plurality of pages of the document includes a bar-code, and
the detecting unit is configured to detect the abnormal reading based on a reading result of the bar-code.

9. The image reading apparatus according to claim 1, wherein the detecting unit is configured to detect the abnormal reading based on an OCR result of a specific area of the image on the plurality of pages of the document.

10. The image reading apparatus according to claim 1, wherein the detecting unit is configured to detect the abnormal reading based on a size of the plurality of pages of the document.

11. The image reading apparatus according to claim 1, wherein
the stacking unit further includes
a first stacking unit configured to stack the plurality of pages of the document in which the abnormal reading is detected by the detecting unit, and
a second stacking unit configured to stack the plurality of pages of the document in which the abnormal reading is not detected,
the ejecting unit includes a stack switching unit configured to switch to the first stacking unit or the second stacking unit to eject the plurality of pages of the document read by the reading unit, and
the separation stacking unit is configured to control the stack switching unit to eject the plurality of pages of the document in which the abnormal reading is detected by the detecting unit to the first stacking unit and eject the plurality of pages of the document in which the abnormal reading is not detected to the second stacking unit.

12. The image reading apparatus according to claim 1, wherein
the ejecting unit includes an ejection force switching unit configured to switch an ejection force when ejecting the plurality of pages of the document read by the reading unit to the stacking unit, and
the separation stacking unit is configured to control the ejection force of the ejection force switching unit to stack the plurality of pages of the document in which the abnormal reading is detected by the detecting unit and the plurality of pages of the document in which the abnormal reading is not detected to different positions of the stacking unit.

13. An image reading method executed by an image reading apparatus including a hopper unit that places a document with a plurality of pages thereon, a separating unit that separates the plurality of pages of the document placed on the hopper unit, a reading unit that reads an image on the plurality of pages of the document separated by the separating unit, an ejecting unit that ejects the plurality of pages of the document after reading the image by the reading unit, a stacking unit that stacks the plurality of pages of the document ejected by the ejecting unit, a control unit, and a storage unit, the image reading method comprising:
a detecting step of detecting multiple feeding of the document as abnormal reading of the document by the reading unit;
an image storing step of counting multiple-fed pages of the document as one page and storing only an image of the plurality of the pages of the document corresponding to a reading order when the multiple feeding is detected at the detecting step in the storage unit;
a separation stacking step of controlling the ejecting unit to separately eject at least one page of the document for which the abnormal reading is detected at the detecting step and at least one page of the document for which the abnormal reading is not detected to the stacking unit;
a rereading step of causing the reading unit to read again the image on the at least one page of the document, for which the abnormal reading is detected at the detecting step and which is separately ejected at the separation stacking step to the stacking unit, to obtain a reread image;

an image replacing step of replacing the image of the page of the document stored at the image storing step, which corresponds to the reading order, with the reread image obtained at the rereading step when the reread image is obtained at the rereading step; and a reading order resetting step of resetting the reading order when the image of the page of the document stored at the image storing step is replaced, at the image replacing step, with the reread image obtained at the rereading step, considering actual pages of the multiple-fed pages, wherein the reading order resetting step includes reviving page numbers of the multiple-fed pages and resetting a page number of a document following the multiple-fed pages based on the revived page numbers of the multiple-fed pages to allow the reset reading order to be the same as an order of the plurality of pages of the document placed on the hopper unit.

14. A computer program product having a non-transitory computer readable medium including programmed instructions for an image reading method to be executed by an image reading apparatus including a hopper unit that places a document with a plurality of pages thereon, a separating unit that separates the plurality of pages of the document placed on the hopper unit, a reading unit that reads an image on the plurality of pages of the document separated by the separating unit, an ejecting unit that ejects the plurality of pages of the document after reading the image by the reading unit, a stacking unit that stacks the plurality of pages of the document ejected by the ejecting unit, a control unit, and a storage unit, the instructions, when executed by the control unit, causing the control unit to perform:

a detecting step of detecting multiple feeding of the document as abnormal reading of the document by the reading unit;

an image storing step of counting multiple-fed pages as one page and storing only an image of the plurality of pages of the document corresponding to a reading order when the multiple feeding is detected at the detecting step in the storage unit;

a separation stacking step of controlling the ejecting unit to separately eject at least one page of the document for which the abnormal reading is detected at the detecting step and at least one page of the document for which the abnormal reading is not detected to the stacking unit;

a rereading step of causing the reading unit to read again the image on the at least one page of the document, for which the abnormal reading is detected at the detecting step and which is separately ejected at the separation stacking step to the stacking unit, to obtain a reread image;

an image replacing step of replacing the image of the page of the document stored at the image storing step, which corresponds to the reading order, with the reread image obtained at the rereading step when the reread image is obtained at the rereading step; and a reading order resetting step of resetting the reading order when the image of the page of the document stored at the image storing step is replaced, at the image replacing step, with the reread image obtained at the rereading step, considering actual pages of the multiple-fed pages, wherein the reading order resetting step includes reviving page numbers of the multiple-fed pages and resetting a page number of a document following the multi-fed documents based on the revived page numbers of the multiple-fed pages to allow the reset reading order to be the same as an order of the plurality of pages of the document placed on the hopper unit.

\* \* \* \* \*